(12) United States Patent
Yoo et al.

(10) Patent No.: US 7,982,759 B2
(45) Date of Patent: Jul. 19, 2011

(54) LIGHT SCANNING UNIT AND IMAGE FORMING APPARATUS HAVING THE SAME

(75) Inventors: Seung-cheol Yoo, Gwacheon-si (KR); Young-jin Park, Bucheon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 67 days.

(21) Appl. No.: 12/389,412

(22) Filed: Feb. 20, 2009

(65) Prior Publication Data

US 2010/0033767 A1 Feb. 11, 2010

(51) Int. Cl.
*B41J 2/435* (2006.01)
*B41J 2/47* (2006.01)

(52) U.S. Cl. ........................................ 347/235; 347/250

(58) Field of Classification Search .................. 347/234, 347/235, 229, 248–250
See application file for complete search history.

(56) References Cited

U.S. PATENT DOCUMENTS 6,075,586 A * 6/2000 Ohtomo et al. .............. 356/4.08
7,186,970 B2 * 3/2007 Cannon et al. ................ 250/235
* cited by examiner

*Primary Examiner* — Hai C Pham
(74) *Attorney, Agent, or Firm* — Staas & Halsey LLP (57) ABSTRACT

A light scanning unit of an image forming apparatus to scan a light beam in forward and reverse directions, the light scanning unit including: a beam deflector to deflect the light beam, and to form forward direction and reverse direction scanning lines in an image section and first and second non-image sections respectively provided on opposite sides of the image section; a reflecting member to reflect a light beam inputted from the beam deflector; and a light detecting unit to receive a first light beam directly inputted from the beam deflector, and a second light beam inputted via the reflecting member, wherein the reflecting member includes a reflecting unit to reflect the inputted light beam to the light detecting unit, and a distinguishing unit to distinguish the reflected second light beam from the first light beam.

26 Claims, 7 Drawing Sheets

LIGHT SCANNING UNIT AND IMAGE FORMING APPARATUS HAVING THE SAME

CROSS-REFERENCE TO RELATED APPLICATION

This application claims priority from Korean Patent Application No. 10-2008-0077983, filed on Aug. 8, 2008 in the Korean Intellectual Property Office, the disclosure of which is incorporated herein by reference.

BACKGROUND OF THE INVENTION

1. Field of the Invention

Aspects of the present invention relate to a light scanning unit reciprocatingly scanning a light in forward and reverse directions and an image forming apparatus having the same, and more particularly, to a light scanning unit and an image forming apparatus having the same easily distinguishing which of a forward direction or a reverse direction a scanning direction of a light beam is.

2. Description of the Related Art

In general, a light scanning unit is employed on an image forming apparatus (such as a printer, a digital copier, a facsimile, a multi-function peripheral, etc.), and other devices (such as a bar code reader). An image forming apparatus employing the light scanning unit forms a latent image on an image carrying body through a main scanning by a beam deflector, and a sub scanning by driving of the image carrying body.

The light scanning unit includes a light source to generate and emit a light beam having a predetermined wavelength, and a beam deflector to deflect the light beam emitted from the light source. The beam deflector can be a rotation type using a rotating body (such as a rotating multi surface mirror) and a hologram disk to deflect an inputted light beam in a direction, and a resonance mirror type using a resonance mirror reciprocatingly rotating in a predetermined angle to reciprocatingly scan an inputted light beam in forward and reverse directions.

Unlike the rotation type, in the beam deflector of the resonance mirror type, whether a scanning direction of the light beam is a forward direction or a reverse direction is to be correctly determined when an image signal is applied to the light source.

The light scanning unit employing the beam deflector of a conventional resonance mirror includes at least two light detecting units disposed in non-image forming sections respectively provided on opposite sides of an image forming section to determine whether the scanning direction is the forward direction or the reverse direction. In this case, the scanning direction may be determined through each light detecting unit, and an image signal corresponding to each scanning direction may be applied.

However, since the conventional light scanning unit includes at least two light detecting units, a manufacturing cost increases. Furthermore, since electric connection and disconnection and a signal processing with respect to each light detecting unit are necessary, a circuit configuration is complicated.

SUMMARY OF THE INVENTION

Aspects of the present invention provide a light scanning unit and an image forming apparatus having the same easily distinguishing a scanning direction of a light beam that is reciprocatingly scanned by using a single light detecting unit.

According to an aspect of the present invention, there is provided a light scanning unit to scan a light beam in forward and reverse directions, the light scanning unit including: a light source to emit a light beam; a beam deflector to deflect the light beam, and to form forward direction and reverse direction scanning lines in an image section and first and second non-image sections respectively provided on opposite sides of the image section; a reflecting member to reflect a light beam inputted from the beam deflector; and a light detecting unit to receive a first light beam directly inputted from the beam deflector, and a second light beam inputted via the reflecting member, wherein the reflecting member includes a reflecting unit to reflect the inputted light beam to the light detecting unit as the second light beam, and a distinguishing unit to distinguish the second light beam from the first light beam.

The light detecting unit and the reflecting member may be provided in the first and the second non-image sections, respectively.

The reflecting unit may include at least two reflecting areas that are distanced from each other, and the distinguishing unit may be provided between the at least two reflecting areas.

The distinguishing unit may transmit, absorb, diffuse, and/or diffusedly reflect the light beam inputted from the beam deflector, or reflect the light beam away from the light detecting unit.

A time margin between a front end synchronizing signal detecting time of the forward direction scanning line and a starting time of the image section that is adjacent to the second non-image section, determined based on the first and the second light beams received by the detecting unit, may be a first time margin, a time margin between a front end synchronizing signal detecting time of the reverse direction scanning line and a starting time of the image section that is adjacent to the first non-image section, determined based on the first and the second light beams received by the detecting unit, may be a second time margin, and the first time margin and the second time margin may be substantially equal.

The reflecting member and the light detecting unit may be symmetrically provided in the first and the second non-image sections, respectively, with respect to a center of the image section.

The light scanning unit may further include a control unit to determine whether the scanning line is the forward direction or the reverse direction according to a difference between signals that respectively correspond to the first and the second light beams detected by the light detecting unit, and to control the light source to emit the light beam that has the image information corresponding to a scanning direction of the scanning line.

The beam deflector may include a resonance mirror.

According to another aspect of the present invention, there is provided a light scanning unit to scan a light beam in forward and reverse directions, the light scanning unit including: a beam deflector to deflect the light beam, and to form forward direction and reverse direction scanning lines to an image section and first and second non-image sections provided on opposite sides of the image section respectively; a reflecting member including at least two reflecting units distanced from each other to reflect a light beam inputted from the beam deflector; and a light detecting unit to receive a first light beam directly inputted from the beam deflector, and a second light beam inputted via the reflecting member.

The light detecting unit and the reflecting member may be provided in the first and the second non-image sections, respectively.

A time margin between a front end synchronizing signal detecting time of the forward direction scanning line and a starting time of the image section that is adjacent to the second non-image section, determined based on the first and the second light beams received by the detecting unit, may be a first time margin, a time margin between a front end synchronizing signal detecting time of the reverse direction scanning line and a starting time of the image section that is adjacent to the first non-image section, determined based on the first and the second light beams received by the detecting unit, may be a second time margin, and the first time margin and the second time margin may be substantially equal.

The reflecting member and the light detecting unit may be symmetrically provided in the first and the second non-image sections with respect to a center of the image section.

The light scanning unit may further include a control unit to determine whether the scanning line is the forward direction or the reverse direction according to a difference between signals that respectively correspond to the first and the second light beams detected by the light detecting unit, and to control a light source to emit the light beam that has the image information corresponding to a scanning direction of the scanning line.

The beam deflector may include a resonance mirror.

According to another aspect of the present invention, there is provided an image forming apparatus, including: an image carrying body; a light scanning unit to scan a light beam on the image carrying body to form a latent image; a developing unit to develop a visible image on the image carrying body; a transferring unit to transfer the visible image developed on the image carrying body to a print medium; and a fusing unit to fuse the visible image transferred to the print medium, wherein the light scanning unit includes: a light source to emit a light beam, a beam deflector to deflect the light beam, and to form forward direction and reverse direction scanning lines in an image section and first and the second non-image sections respectively provided on opposite sides of the image section, a reflecting member to reflect a light beam inputted from the beam deflector, and a light detecting unit to receive a first light beam directly inputted from the beam deflector, and a second light beam inputted via the reflecting member, wherein the reflecting member comprises a reflecting unit to reflect the inputted light beam to the light detecting unit as the second light beam, and a distinguishing unit to distinguish the reflected second light beam from the first light beam.

The light detecting unit and the reflecting member may be respectively provided in the first and the second non-image sections.

The reflecting unit may include at least two reflecting areas that are distanced from each other, and the distinguishing unit is provided between the at least two reflecting areas.

The distinguishing unit may transmit, absorb, diffuse, and/or diffusedly reflect the light beam which is inputted from the beam deflector, or reflect the light beam away from the light detecting unit.

A time margin between a front end synchronizing signal detecting time of the forward direction scanning line and a starting time of the image section that is adjacent to the second non-image section, determined based on the first and the second light beams received by the detecting unit, may be a first time margin, a time margin between a front end synchronizing signal detecting time of the reverse direction scanning line and a starting time of the image section that is adjacent to the first non-image section, determined based on the first and the second light beams received by the detecting unit, may be a second time margin, the first time margin and the second time margin may be substantially equal.

The reflecting member and the light detecting unit may be symmetrically provided in the first and the second non-image sections, respectively, with respect to a center of the image section.

The image forming apparatus may further include a control unit to determine whether the scanning line is the forward direction or the reverse direction according to a difference between signals that respectively correspond to the first and the second light beams detected by the light detecting unit, and to control a light source to emit the light beam that has the image information corresponding to a scanning direction of the scanning line.

The beam deflector may include a resonance mirror.

According to another aspect of the present invention, there is provided a method of determining a scanning direction of a light beam, the method including: deflecting, by a beam deflector, the light beam to form forward direction and reverse direction scanning lines in an image section and first and second non-image sections respectively provided on opposite sides of the image section; reflecting, by a reflecting member, a light beam inputted from the beam deflector; receiving a first light beam directly inputted from the beam deflector, and a second light beam reflected by the reflecting unit; and determining whether the scanning line of the light beam is the forward direction or the reverse direction according to a difference between signals that respectively correspond to the received first and the received second light beams by the light detecting unit, wherein the reflecting member distinguishes the reflected second light beam from the first light beam.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to like elements throughout. The exemplary embodiments are described below so as to explain the present invention by referring to the figures. Repetitive description with respect to like elements of different embodiments may be omitted for the convenience of clarity.

Figure 1:
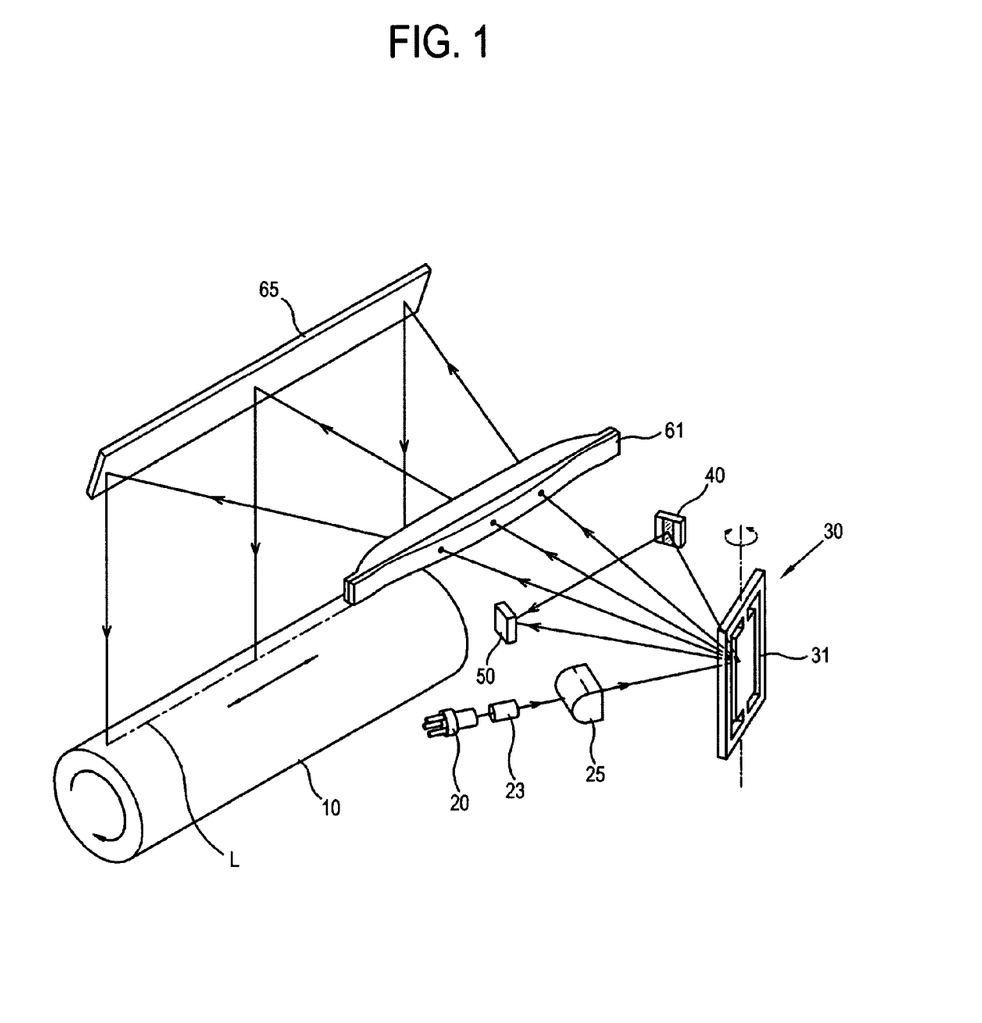
FIG. 1 is a perspective view illustrating a light scanning unit according to an embodiment of the present invention.
Figure 2:
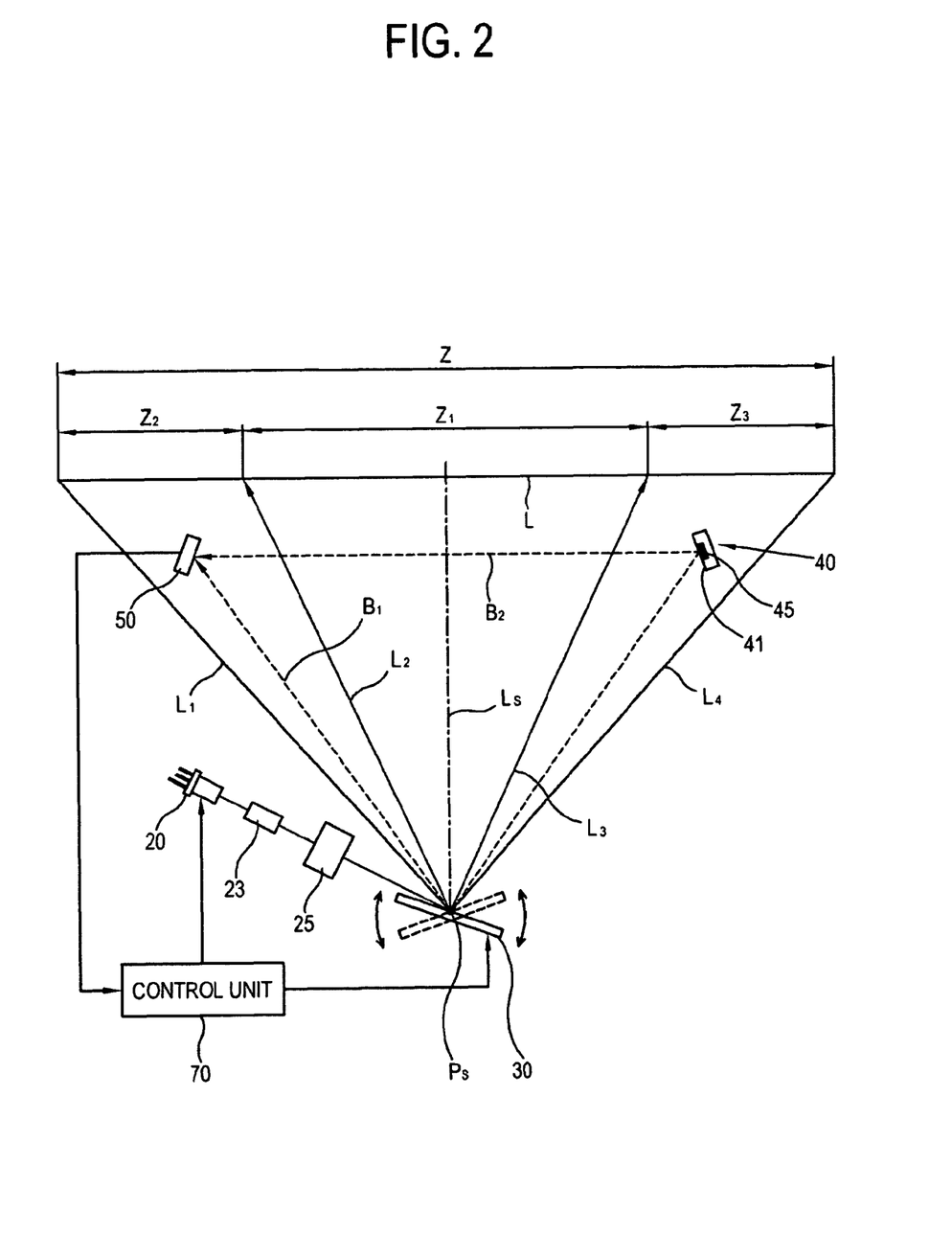
FIG. 2 is a schematic plane view illustrating a light scanning unit according an embodiment of the present invention.

FIGS. 1 and 2 are, respectively, a perspective view and a schematic plane view illustrating a light scanning unit according to an embodiment of the present invention. Referring to FIGS. 1 and 2, the light scanning unit includes a light source 20 to scan (i.e., emit) a light beam, a beam deflector 30 to reciprocatingly deflect the scanned light beam in order to form a scanning line L on an image carrying body 10, a reflecting member to determine a scanning direction of the scanning line L and to detect a front end synchronizing signal of an effective image section, and a light detecting unit 50. Also, the light scanning unit further includes a control unit 70 to control the light source 20 based on a signal detected by the light detecting unit 50.

The light source 20 is implemented as a semiconductor element (such as a laser diode, etc.) emitting a light having a predetermined wavelength, and is controlled to be turned on and off by the control unit 70 to emit a light beam corresponding to an inputted image signal.

The beam deflector 30 reciprocatingly deflects the light beam emitted from the light source 20, and forms a forward direction scanning line and a reverse direction scanning line on an image section $Z_1$, and first and second non-image sections $Z_2$ and $Z_3$ respectively provided on opposite sides of the image section $Z_1$. Specifically, the beam deflector 30 includes a resonance mirror 31 that reciprocatingly rotates. The beam deflector 30 may be a micro electromechanical systems (MEMS) scanner using a micro electromechanical system technology that deflects the light beam inputted from a light source in forward and reverse directions while the resonance mirror 31 reciprocatingly rotates. The beam deflector 30 of the resonance type is vibrated with a predetermined resonance frequency (i.e., a driving frequency) to scan the light beam B, and may be implemented with various configurations, detailed descriptions of which are omitted. Here, if the light scanning unit is disposed as shown in FIGS. 1 and 2, the forward direction scanning line is a scanning line formed when the beam deflector 30 rotates in a clockwise direction (driven from a dotted line position to a solid line position in FIG. 2). Conversely, the reverse direction scanning line is a scanning line formed when the beam deflector 30 rotates in a counterclockwise direction (driven from the solid line position to the dotted line position in FIG. 2).

A total section Z of the scanning line L in the forward and reverse directions is classified into the image section $Z_1$, and the first and second non-image sections $Z_2$ and $Z_3$ respectively provided on opposite sides of the image section $Z_1$. The image section $Z_1$ is formed in a central area of the total section Z, and is a section to which a light beam including image information is scanned. The first non-image section $Z_2$ and the second non-image section $Z_3$ are sections to which the light beam B not including the image information is scanned. In FIG. 2, the first non-image section $Z_2$ and the second non-image section $Z_3$ are respectively illustrated on a left side and a right side of the image section $Z_1$. However, this is for the convenience of description, and it is understood that aspects of the present invention are not limited thereto.

Reference marks shown in FIG. 2 are illustrated in order to clearly describe the embodiment of the present invention as follows. Ps is a point at which the light beam emitted from the light source 20 is reflected by the beam deflector 30, and Ls is a line connecting Ps and a center of the image section $Z_1$. A first line $L_1$ connects a front end of the first non-image section $Z_2$ not contacting the image section $Z_1$ and Ps. A second line $L_2$ connects a boundary between the image section $Z_1$ and the first non-image section $Z_2$ and Ps. A third line $L_3$ connects a boundary between the image section $Z_1$ and the second non-image section $Z_3$ and Ps. A fourth line $L_4$ connects a rear end of the second image section $Z_3$ not contacting the image section $Z_1$ and Ps.

The reflecting member 40 is provided in the second non-image section $Z_3$, and reflects a light beam from the beam deflector 30 to the light detecting unit 50. The light detecting unit 50 is provided in the first non-image section $Z_2$, and receives a first light beam $B_1$ directly inputted, and a second light beam $B_2$ inputted via the reflecting member 40. In more detail, the reflecting member 40 includes a reflecting unit 41 to reflect an inputted light, and a distinguishing unit 45 to distinguish the second light beam $B_2$ from the first light beam $B_1$. The reflecting unit 41 includes at least two reflecting areas divided in a direction of the scanning line, and the distinguishing unit 45 is formed between the divided reflecting areas. The distinguishing unit 45 prevents a light beam inputted from the beam deflector 30 from proceeding toward the light detecting unit 50 so that the second light beam $B_2$ can have a different scanning pattern from the first light beam $B_1$.

Figure 3A:
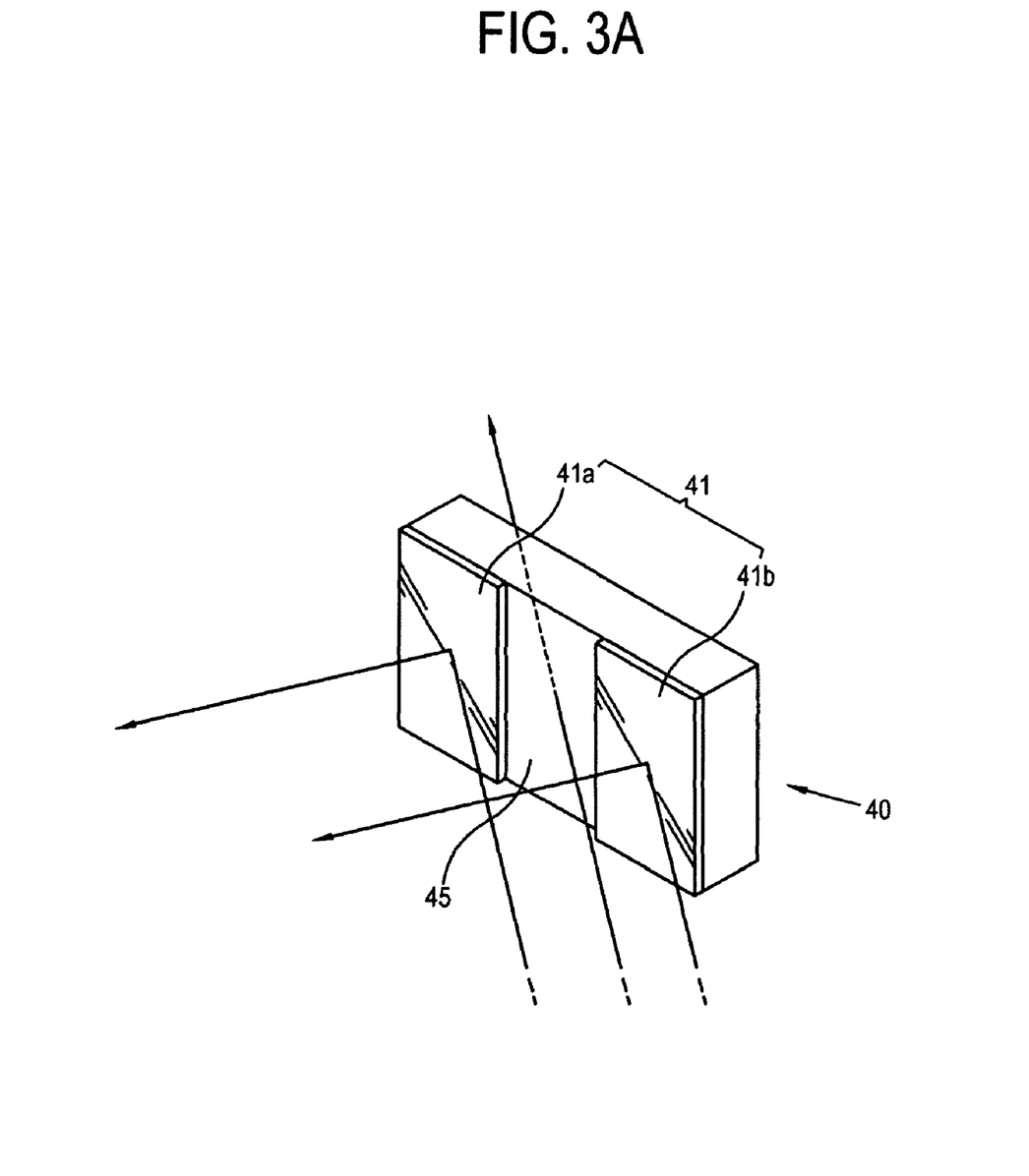
FIGS. 3A to 3C respectively illustrate examples of a reflecting member of the light scanning unit according to an embodiment of the present invention.

FIG. 3A illustrates a configuration in which the reflecting unit 41 includes first and second reflecting areas 41a and 41b, and the distinguishing unit 45 provided therebetween according to an embodiment of the present invention. However, it is understood that aspects of the present invention are not limited thereto. For example, the reflecting unit 41 may include more than two reflecting areas, and a plurality of distinguishing units 45 may be respectively disposed between the reflecting areas adjacent to each other.

Figure 3B:
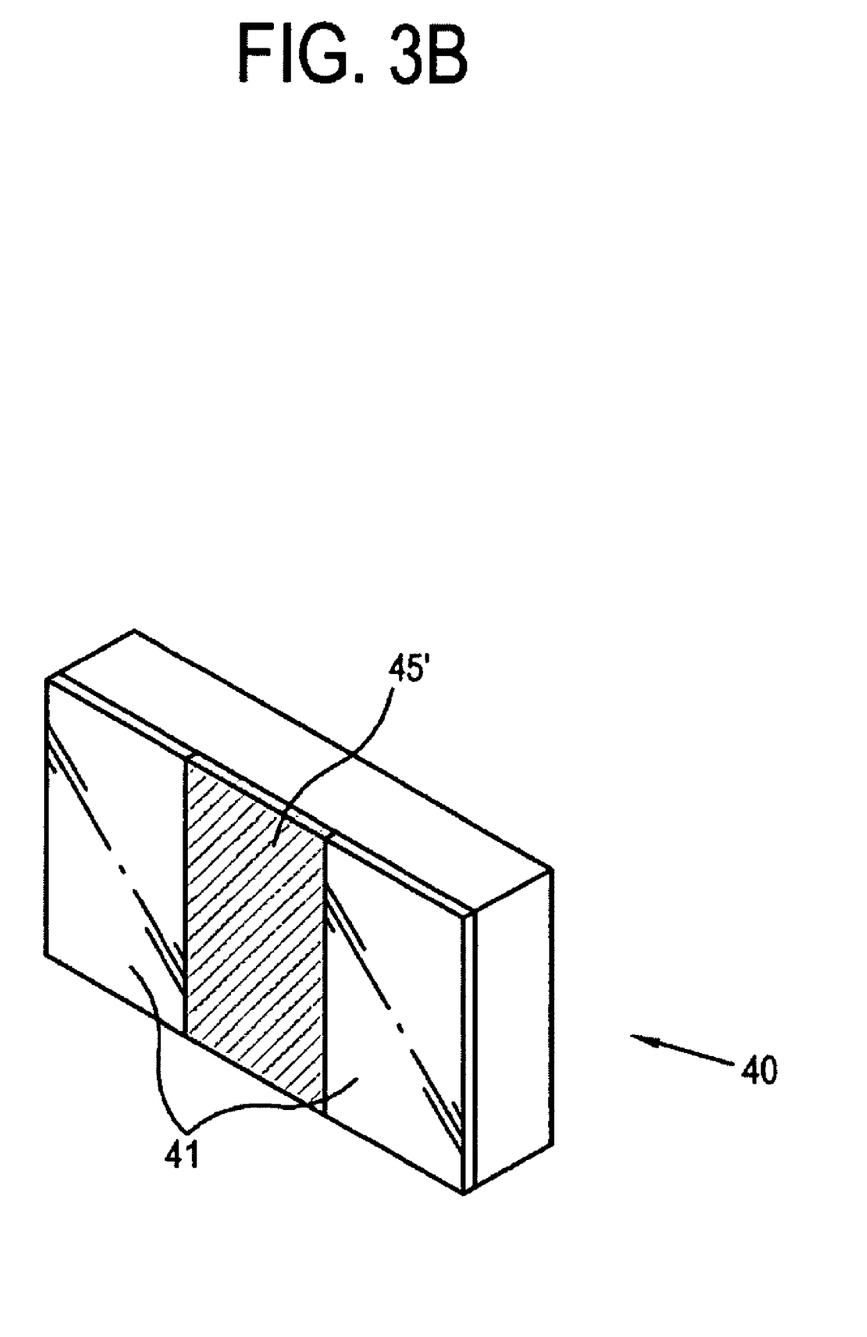
Figure 3C:
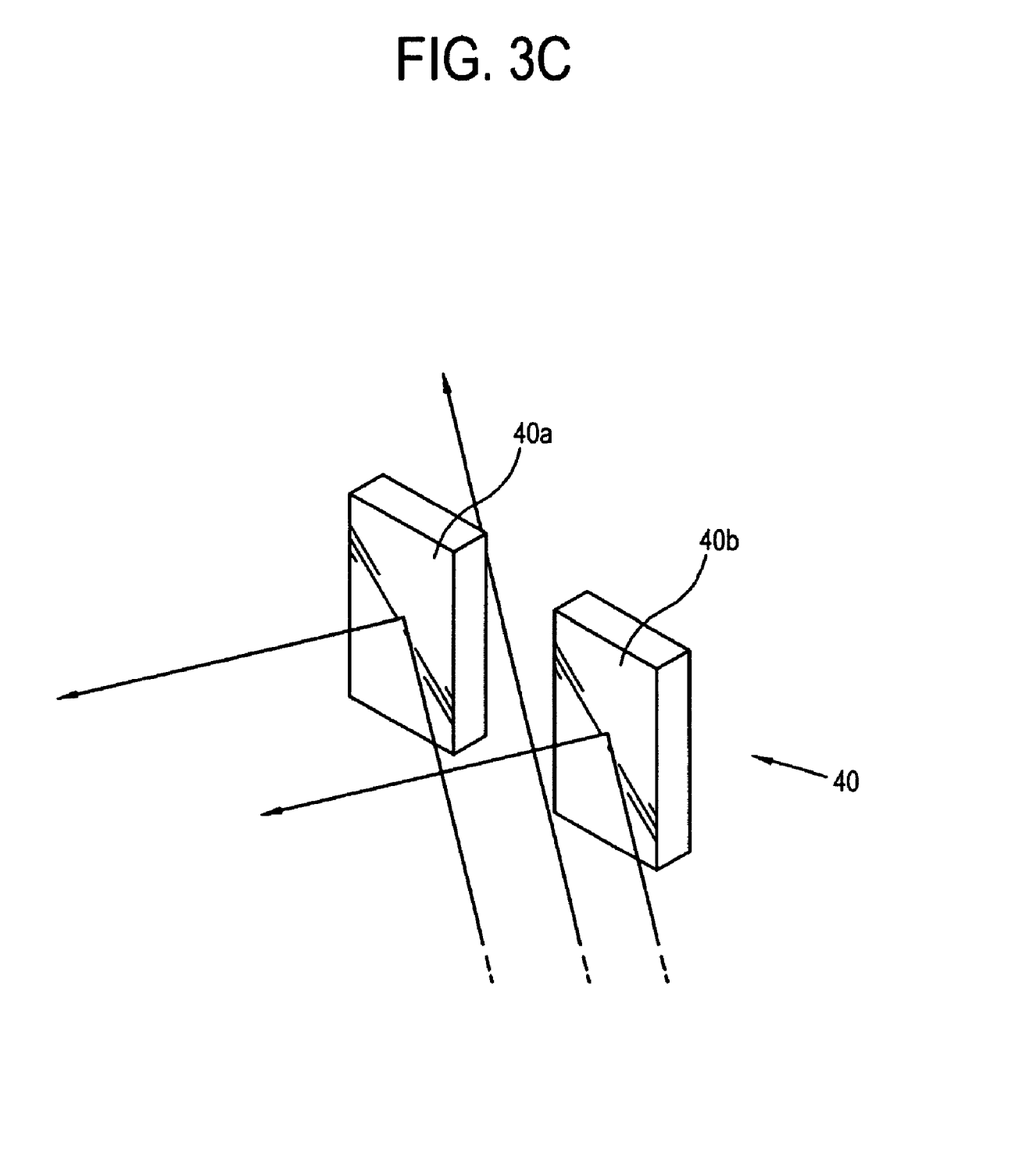

FIGS. 3A and 3B illustrate examples in which the distinguishing unit 45 transmits and absorbs an inputted light beam, respectively. Referring to FIG. 3A, the distinguishing unit 45 according to a first example is implemented as a transparent window formed to transmit an inputted light. Accordingly, a portion of a light beam inputted to the reflecting unit 41 from among the light beam scanned to the reflecting member 40 is reflected to proceed to the light detecting unit 50. On the other hand, a scanning light inputted to the transparent window 45 passes through the transparent window, and thus does not proceed to the light detecting unit 50. Referring to FIG. 3B, a distinguishing unit 45' according to a second example is implemented as an absorbing member to absorb an inputted light. Accordingly, a portion of a light beam inputted to the reflecting unit 41 from among the light beam scanned to the reflecting member 40 is reflected to proceed to the light detecting unit 50. On the other hand, a scanning light inputted to the absorbing member 45' is absorbed by the absorbing member, and thus does not proceed to the light detecting unit 50. It is understood that, according to other aspects, the distinguishing units 45 and 45' may employ various changes to the configurations shown in FIGS. 3A and 3B. For example, the distinguishing unit may diffuse or diffusedly reflect an inputted light, or reflect an inputted light away from the light detecting unit 50 such that a light inputted to the distinguishing unit 45 can be directed toward a proceeding path different from a proceeding path of a light beam reflected from the reflecting unit 41. Also, in configuring the reflecting member 40, instead of using a separate physical configuration as the distinguishing unit, the distinguishing unit may be implemented by physically distancing at least two reflecting units 40a and 40b reflecting an inputted light, as illustrated in FIG. 3C.

Figure 4:
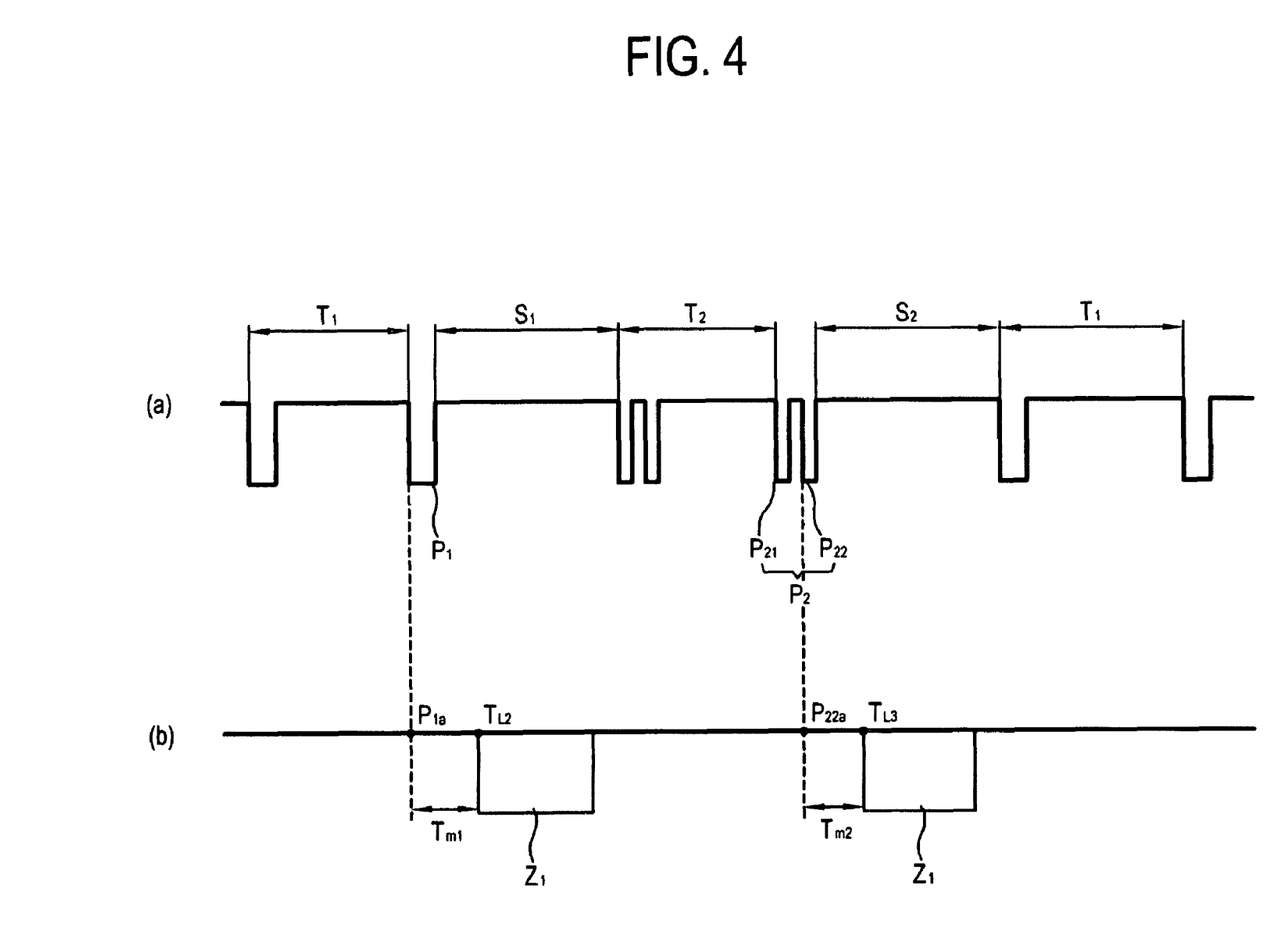
FIGS. 4A to 4B illustrate a signal pattern variation depending on time detected by a light detecting unit of a light scanning unit according to an embodiment of the present invention, and a relation between a signal pattern and an effective image section.

By configuring the reflecting member 40 as described above, a pattern ($P_1$ in FIG. 4A) of the first light beam $B_1$ directly inputted to the light detecting unit 50 from the beam deflector 30, and a pattern ($P_2$ in FIG. 4A) of the second light beam $B_2$ inputted to the light detecting unit 50 via the reflecting member 40 are distinguished from each other.

The control unit 70 determines whether a scanning direction of a light beam deflected by the beam deflector 30 is a forward direction or a reverse direction from a signal pattern difference with respect to the first light beam $B_1$ and the second light beam $B_2$ detected by the light detecting unit 50. Also, the control unit 70 controls the light source 20 to emit a light beam having image information corresponding to the scanning direction of the determined scanning line.

FIG. 4A illustrates a signal pattern variation according to time detected by the light detecting unit 50 of the light scanning unit according to an embodiment of the present invention, and FIG. 4B illustrates a relation between a signal pattern and an effective image section. Referring to FIG. 4A, $P_1$ is a signal pattern formed by the first light beam $B_1$ directly inputted to the light detecting unit 50 from the beam deflector 30, and $P_2$ is a signal pattern formed by the second light beam $B_2$ inputted to the light detecting unit 50 via the reflecting member 40. Here, the signal pattern $P_2$ results from an effect according to a dividing of the reflecting area into a plurality of sections in configuring the reflecting member 40, and has a different signal pattern from the signal pattern $P_1$. For example, if the reflecting unit 41 includes the first and second reflecting areas 41a and 41b as shown in FIG. 3A, the signal pattern $P_2$ is formed by the second light beam $B_2$ respectively reflected from the first and second reflecting areas 41a and 41b, and includes two signal patterns $P_{21}$ and $P_{22}$ formed to be distanced from each other.

Also, $T_1$ represents a time section in which a scanning line forming direction is changed from a reverse direction scanning to a forward direction scanning through a direction change of the beam deflector 30. That is, $T_1$ represents a time section from a point of time in which the first light beam $B_1$ is detected through the light detecting unit 50 to a point of time in which the first light beam $B_1$ is detected again when the scanning line moves to the first line $L_1$ and then returns to the second line $L_2$.

Furthermore, $T_2$ represents a time section in which the scanning line forming direction is changed from the forward direction scanning to the reverse direction scanning through a direction change of the beam deflector 30. That is, $T_2$ represents a time section from a point of time in which the light detecting unit 50 detects the second light beam $B_2$ inputted via the reflecting member 40 to a point of time in which the light detecting unit 50 detects the second light beam $B_2$ again when the scanning line moves to the fourth line $L_4$ and then returns to the third line $L_3$. Moreover, $S_1$ and $S_2$ respectively represent a forward direction scanning section and a reverse direction scanning section between the light detecting unit 50 and the reflecting member 40.

Since the signal pattern detected by the light detecting unit 50 is distinguished by configuring the reflecting member 40 as describe above, whether a signal detected by the light detecting unit 50 is a signal by the first light beam $B_1$ or a signal by the second light beam $B_2$ can be determined. Accordingly, the scanning section of the scanning line can be determined to be in the forward direction scanning section $S_1$ or in the reverse direction scanning section $S_2$.

Referring to FIGS. 4A and 4B, in configuring the light scanning unit, a first time margin $T_{m1}$ and a second time margin $T_{m2}$ may be determined to be the substantially same. Here, the first time margin $T_{m1}$ is a time margin between a front end synchronizing signal detecting time $P_{1a}$ of the forward direction scanning line and a starting time $T_{L2}$ of the image section $Z_1$ adjacent to the first non-image section $Z_2$. Also, the second time margin $T_{m2}$ is a time margin between a front end synchronizing signal detecting time $P_{22a}$ of the reverse direction scanning line and a starting time $T_{L3}$ of the image section $Z_1$ adjacent to the second non-image section $Z_3$.

For the above configuration, the light detecting unit 50 and the reflecting member 40 may be provided to be symmetrical to the first and second non-image sections $Z_2$ and $Z_3$, respectively, with respect to the center Ls of the image section $Z_1$. Accordingly, by determining the first and second time margins $T_{m1}$ and $T_{m2}$ to be substantially the same, an effective image section may be easily determined irrespective of the scanning direction of the scanning line.

Also, the light scanning unit according to aspects the present invention may further include a collimating lens 23 and a cylindrical lens 25 provided on a light path between the light source 20 and the beam deflector 30. The collimating lens 23 collects a light beam emitted from the light source 20 to become a parallel beam or a conversed beam. The cylindrical lens 25 collects an inputted beam in a direction corresponding to a main scanning direction and/or a sub scanning direction to image the inputted beam in the beam deflector 30, and may be implemented as at least one sheet of lens.

Also, the light scanning unit according to aspects of the present invention may further include an f-θ lens 61 provided between the beam deflector 30 and the image carrying body 10. The f-θ lens 61 is implemented as at least one piece of lens, and corrects a light deflected by the beam deflector 30 to have different magnifying powers with respect to the main scanning direction and the sub scanning direction to be imaged on the image carrying body 10. Also, a reflecting mirror 65 may be further provided between the f-θ lens 61 and the image carrying body 10. The reflecting mirror 65 reflects a scanning line inputted from the beam deflector 30 so that the scanning line can be formed on a light exposure surface of the image carrying body 10.

The light scanning unit according to an embodiment of the present invention configured as described above may correctly determine the scanning direction of the scanning line by using the reflecting member 40 having at least two reflecting areas 41a and 41b distanced from each other and the single light detecting unit 50 in forming the scanning line of the forward and reverse directions. Accordingly, in comparison with a conventional light scanning using more than two light detecting units, a manufacturing cost and power consumption are reduced. By determining the time margin of the effective image section with respect to the forward and reverse direction scanning lines to be substantially the same, the effective image section may be easily determined irrespective of the scanning direction of the scanning line.

Figure 5:
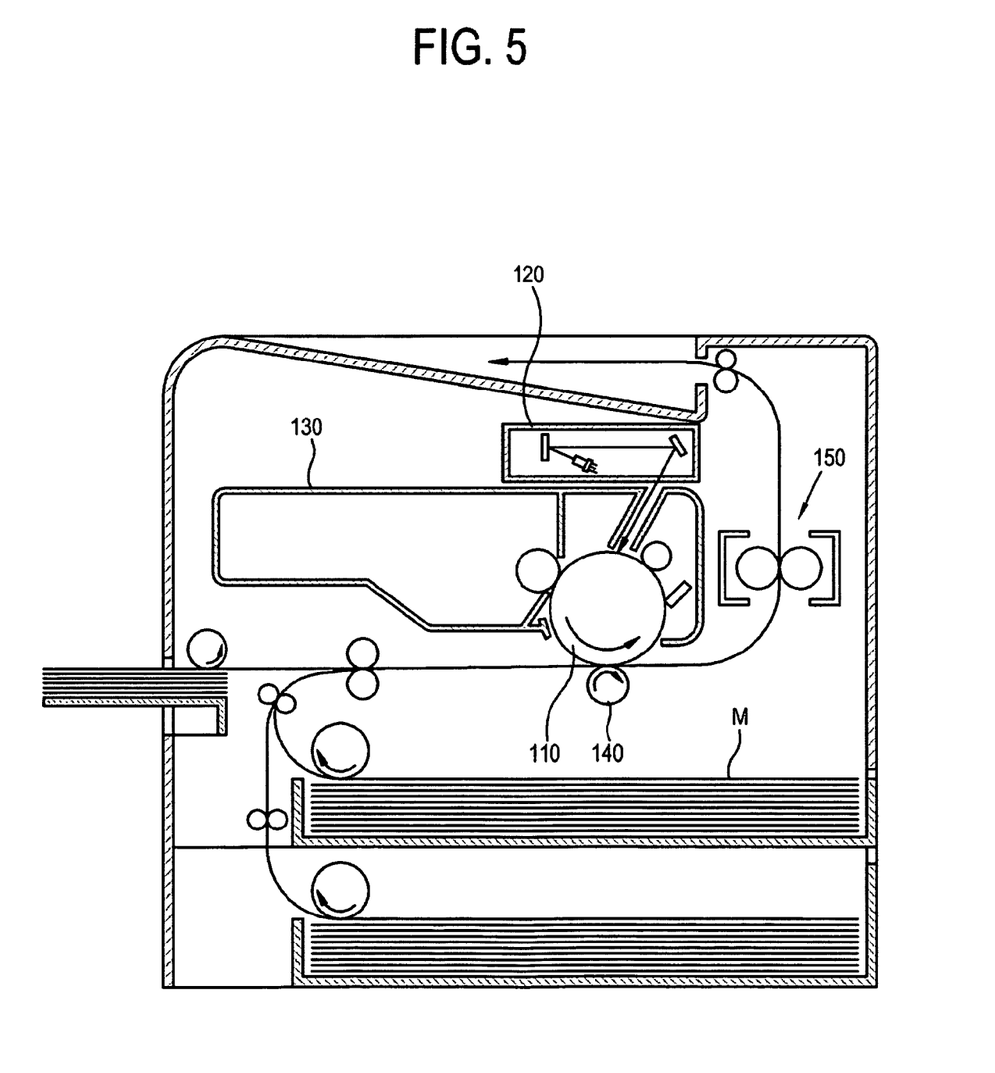
FIG. 5 is a schematic view illustrating an image forming apparatus according to an embodiment of the present invention.

FIG. 5 is a schematic view illustrating an image forming apparatus according to an embodiment of the present invention. Referring to FIG. 5, the image forming apparatus includes an image carrying body 110, a light scanning unit 120 to scan a light beam to the image carrying body 110 to form a latent image, a developing unit 130 to develop a visible image with respect to the latent image formed on the image carrying body 110, a transferring unit 140 to transfer the visible image formed by the developing unit 130 to a print medium M (such as a paper, a transparency, etc.), and a fusing unit 150 to fuse the visible image transferred on the print medium M.

The light scanning unit 120 deflects a light beam emitted from a light source to form forward direction and reverse direction scanning lines on an image section and non-image sections provided on the opposite sides of the image section. The light scanning unit 120 may have substantially the same configuration as the light scanning unit according to the embodiments of the present invention described above with reference to FIGS. 1 to 4B.

The transferring unit 140 is provided to face the image carrying body 110 to interpose the print medium M transported along a transporting path therebetween, and transfers a toner image formed on the image carrying body 110 to the supplied print medium M. The fusing unit 150 is provided on a printing path of the image forming apparatus to fuse the toner image transferred to the print medium M.

As described above, the image forming apparatus according to aspects of the present invention employs the light scanning unit including a beam deflector of a resonance mirror type, thereby compacting the total configuration thereof and reducing the total manufacturing cost. Furthermore, a light scanning unit according to aspects of the present invention configured as described above correctly determines a scanning direction of a scanning line by using a reflecting member having at least two reflecting areas distanced from each other and a single light detecting unit in forming the scanning line of the forward and reverse directions. Accordingly, in comparison with the conventional light scanning unit using more than two light detecting units, a manufacturing cost and power consumption are reduced. By determining the time margin of the effective image section with respect to the forward and reverse direction scanning lines to be substantially the same, the effective image section can easily be determined irrespective of the scanning direction of the scanning line.

Also, since an image forming apparatus according aspects of the present invention described above employs a light scanning unit including a beam deflector of a resonance mirror type, the total configuration of the image forming apparatus can be compacted, and a manufacturing cost can be further reduced.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A light scanning unit to scan a light beam in forward and reverse directions, the light scanning unit comprising:
   a light source to emit a light beam;
   a beam deflector to deflect the light beam, and to form forward direction and reverse direction scanning lines in an image section and first and second non-image sections respectively provided on opposite sides of the image section;
   a reflecting member to reflect a light beam inputted from the beam deflector; and
   a light detecting unit to receive a first light beam directly inputted from the beam deflector, and a second light beam inputted via the reflecting member,
   wherein the reflecting member comprises a reflecting unit to reflect the inputted light beam to the light detecting unit as the second light beam, and a distinguishing unit to distinguish the reflected second light beam from the first light beam.

2. The light scanning unit as claimed in claim 1, wherein the light detecting unit is provided in the first non-image section and the reflecting member is provided in the second non-image section.

3. The light scanning unit as claimed in claim 1, wherein:
   the reflecting unit comprises first and second reflecting areas that are distanced from each other; and
   the distinguishing unit is provided between the first and second reflecting areas.

4. The light scanning unit as claimed in claim 3, wherein the distinguishing unit transmits, absorbs, diffuses, and/or diffusedly reflects the light beam that is inputted from the beam deflector, or reflects the inputted light beam away from the light detecting unit.

5. The light scanning unit as claimed in claim 1, wherein:
   a time margin between a front end synchronizing signal detecting time of the forward direction scanning line and a starting time of the image section that is adjacent to the second non-image section, determined based on the first and the second light beams received by the light detecting unit, is a first time margin;
   a time margin between a front end synchronizing signal detecting time of the reverse direction scanning line and a starting time of the image section that is adjacent to the first non-image section, determined based on the first and the second light beams received by the light detecting unit, is a second time margin; and
   the first time margin and the second time margin are substantially equal.

6. The light scanning unit as claimed in claim 5, wherein the reflecting member and the light detecting unit are symmetrically provided in the first and the second non-image sections, respectively, with respect to a center of the image section.

7. The light scanning unit as claimed in claim 1, further comprising a control unit to determine whether the scanning line of the light beam is the forward direction or the reverse direction according to a difference between signals that respectively correspond to the first and the second light beams received by the light detecting unit, and to control the light source to emit a light beam that has the image information corresponding to a scanning direction of the scanning line.

8. The light scanning unit as claimed in claim 1, wherein the beam deflector comprises a resonance mirror.

9. The light scanning unit as claimed in claim 1, wherein the light scanning unit comprises only one light detecting unit.

10. A light scanning unit to scan a light beam in forward and reverse directions, the light scanning unit comprising:
    a light source to emit a light beam;
    a beam deflector to deflect the light beam, and to form forward direction and reverse direction scanning lines in an image section and first and second non-image sections respectively provided on opposite sides of the image section;
    a reflecting member comprising at least two reflecting units distanced from each other in order to reflect a light beam inputted from the beam deflector; and
    a light detecting unit which to receive a first light beam directly inputted from the beam deflector, and a second light beam inputted via the reflecting member.

11. The light scanning unit as claimed in claim 10, wherein the light detecting unit is provided in the first non-image section and the reflecting member is provided in the second non-image section.

12. The light scanning unit as claimed in claim 10, wherein:
    a time margin between a front end synchronizing signal detecting time of the forward direction scanning line and a starting time of the image section that is adjacent to the second non-image section, determined based on the first and the second light beams received by the light detecting unit, is a first time margin;
    a time margin between a front end synchronizing signal detecting time of the reverse direction scanning line and a starting time of the image section that is adjacent to the first non-image section, determined based on the first and the second light beams received by the light detecting unit, is a second time margin; and the first time margin and the second time margin are substantially equal.

13. The light scanning unit as claimed in claim 12, wherein the reflecting member and the light detecting unit are symmetrically provided in the first and the second non-image sections, respectively, with respect to a center of the image section.

14. The light scanning unit as claimed in claim 10, further comprising a control unit to determine whether the scanning line of the light beam is the forward direction or the reverse direction according to a difference between signals that respectively correspond to the first and the second light beams received by the light detecting unit, and to control the light source to emit a light beam that has the image information corresponding to a scanning direction of the scanning line.

15. The light scanning unit as claimed in claim 10, wherein the beam deflector comprises a resonance mirror.

16. The light scanning unit as claimed in claim 10, wherein the light scanning unit comprises only one light detecting unit.

17. An image forming apparatus, comprising:
   an image carrying body;
   a light scanning unit to scan a light beam on the image carrying body to form a latent image thereon;
   a developing unit to develop a visible image on the image carrying body according to the latent image;
   a transferring unit to transfer the visible image developed on the image carrying body to a print medium; and
   a fusing unit to fuse the visible image transferred to the print medium,
   wherein the light scanning unit comprises:
      a light source to emit a light beam,
      a beam deflector to deflect the light beam, and to form forward direction and reverse direction scanning lines in an image section and first and the second non-image sections respectively provided on opposite sides of the image section,
      a reflecting member to reflect a light beam inputted from the beam deflector, and
      a light detecting unit to receive a first light beam directly inputted from the beam deflector, and a second light beam inputted via the reflecting member,
   wherein the reflecting member comprises a reflecting unit to reflect the inputted light beam to the light detecting unit as the second light beam, and a distinguishing unit to distinguish the reflected second light beam from the first light beam.

18. The image forming apparatus as claimed in claim 17, wherein the light detecting unit is provided in the first non-image section and the reflecting member is provided in the second non-image section.

19. The image forming apparatus as claimed in claim 17, wherein:
   the reflecting unit comprises first and second reflecting areas that are distanced from each other; and
   the distinguishing unit is provided between the first and the second reflecting areas.

20. The image forming apparatus as claimed in claim 19, wherein the distinguishing unit transmits, absorbs, diffuses, and/or diffusedly reflects the light beam that is inputted from the beam deflector, or reflects the inputted light beam away from the light detecting unit.

21. The image forming apparatus as claimed in claim 17, wherein:
   a time margin between a front end synchronizing signal detecting time of the forward direction scanning line and a starting time of the image section that is adjacent to the second non-image section, determined based on the first and the second light beams received by the light detecting unit, is a first time margin;
   a time margin between a front end synchronizing signal detecting time of the reverse direction scanning line and a starting time of the image section that is adjacent to the first non-image section, determined based on the first and the second light beams received by the light detecting unit, is a second time margin; and
   the first time margin and the second time margin are substantially equal.

22. The image forming apparatus as claimed in claim 21, wherein the reflecting member and the light detecting unit are symmetrically provided in the first and the second non-image sections, respectively, with respect to a center of the image section.

23. The image forming apparatus as claimed in claim 17, further comprising a control unit to determine whether the scanning line of the light beam is the forward direction or the reverse direction according to a difference between signals that respectively correspond to the first and the second light beams received by the light detecting unit, and to control the light source to emit a light beam that has the image information corresponding to a scanning direction of the scanning line.

24. The image forming apparatus as claimed in claim 17, wherein the beam deflector comprises a resonance mirror.

25. The image forming apparatus as claimed in claim 17, wherein the light scanning unit comprises only one light detecting unit.

26. A method of determining a scanning direction of a light beam, the method comprising:
   deflecting, by a beam deflector, the light beam to form forward direction and reverse direction scanning lines in an image section and first and second non-image sections respectively provided on opposite sides of the image section;
   reflecting, by a reflecting member, a light beam inputted from the beam deflector;
   receiving a first light beam directly inputted from the beam deflector, and a second light beam reflected by the reflecting unit; and
   determining whether the scanning line of the light beam is the forward direction or the reverse direction according to a difference between signals that respectively correspond to the received first and the received second light beams by the light detecting unit,
   wherein the reflecting member distinguishes the reflected second light beam from the first light beam.

* * * * *

UNITED STATES PATENT AND TRADEMARK OFFICE
CERTIFICATE OF CORRECTION

| | | |
|---|---|---|
| PATENT NO. | : 7,982,759 B2 | Page 1 of 1 |
| APPLICATION NO. | : 12/389412 | |
| DATED | : July 19, 2011 | |
| INVENTOR(S) | : Seung-cheol Yoo et al. | |

It is certified that error appears in the above-identified patent and that said Letters Patent is hereby corrected as shown below:

Title Page, Column 1, Prior Publication Data, After "US 2010/0033767 A1   Feb. 11, 2010" insert
-- Foreign Application Priority Data Aug. 8, 2008 (KR) ........................ 10-2008-0077983 --.

Signed and Sealed this
Twenty-eighth Day of February, 2012

David J. Kappos
*Director of the United States Patent and Trademark Office*